Aug. 30, 1927.

W. W. ELLIOTT 1,641,130

FLEXIBLE SHAFT DRIVING STAND

Filed Aug. 4, 1921

INVENTOR
W. W. Elliott
BY
C. E. Beach
ATTORNEY

Aug. 30, 1927.

W. W. ELLIOTT 1,641,130

FLEXIBLE SHAFT DRIVING STAND

Filed Aug. 4, 1921     3 Sheets-Sheet 2

INVENTOR
W. W. Elliott
BY
C. E. Beach
ATTORNEY

Aug. 30, 1927.
W. W. ELLIOTT
1,641,130
FLEXIBLE SHAFT DRIVING STAND
Filed Aug. 4, 1921
3 Sheets-Sheet 3

INVENTOR
W. W. Elliott
BY
C. E. Beach
ATTORNEY

Patented Aug. 30, 1927.

1,641,130

UNITED STATES PATENT OFFICE.

WINFRED W. ELLIOTT, OF JOHNSON CITY, NEW YORK, ASSIGNOR TO HIMSELF AND ARTHUR H. SHEAR, COPARTNERS, OF BINGHAMTON, NEW YORK.

FLEXIBLE-SHAFT DRIVING STAND.

Application filed August 4, 1921. Serial No. 489,921.

This invention relates to driving stands for flexible shafts, and is particularly adapted for driving portable shafts employed at various points throughout a comparatively large area as, for example, flexible shaft driven grinders or drills for use on large castings or other objects, floor surfacers, and the like.

Prior portable driving stands having, in some instances, embodied provisions for movement of a rigid shaft for driving a flexible shaft so that approximate alignment therebetween may be maintained during certain movements of the flexible shaft,—in the instance of very small shafts as, for example, those used in dental work, electric driving motors have been arranged to swivel in various directions so as to avoid cramping of the shaft during use thereof in various positions,—but I am not aware of such driving means having been heretofore devised which was suitable for driving comparatively large and heavy shafts such as are frequently required in connection with drilling and grinding operations on large objects.

Other prior driving stands have been provided with flexible shaft carriers comprising driving means consisting of either universal joints, gears or belts and pulleys, or of combinations of such means; and all of such prior driving stands with which I am acquainted have been so arranged that a constant side thrust is applied incident to the action of the driving torque to the flexible shaft at the point of its attachment to such stands. In the use of some of such prior stands, the force of the side thrust referred to is insufficient to prove seriously detrimental when a very limited amount of power is transmitted thereby as, for example, in the case of dental appliances.

Inasmuch, however, as the intensity of the side thrust referred to increases very rapidly both as a result of the use of heavier parts needful for transmitting greater power, and directly incident to increases in the power transmitted, it has been found that objectionably excessive strain is applied to flexible shafts utilized for comparatively heavy work, as, for example, for driving large drills, emery wheels or floor surfacers; and that such shafts rapidly wear and deteriorate and frequently break near the point of attachment to such prior stands, Because of the side thrust just referred to, it has been found to be undesirable to mount prior forms of such driving stands in a readily movable manner, when same are to transmit comparatively large power; as such side thrust will, under certain conditions, cause prior forms of driving stands (if readily movable over the floor or other surfaces upon which they are supported) to creep around so as to cause excessive strain to the flexible shaft and, in extreme instances, to cause disastrous kinking or breaking of the flexible shaft, unless manually or otherwise held against such creeping movement during use thereof.

An object of this invention is to provide a driving stand comprising a source of driving power (such as an electric motor) and which is adapted for so transmitting the driving power of such source to a flexible shaft carried by such stand that such shaft may be employed at any side of the stand, either vertically or horizontally, and which will automatically follow all movements of the working end of such shaft so as to minimize the strain and wear to which such shaft will be subjected because of movements of the working end thereof incident to the intended use thereof.

Another object is to provide such a combined motor and driving stand which is so arranged that the speed ratio of the flexible shaft to the motor may be readily altered.

Another object is to provide such a driving stand in which the driving stresses will be so balanced that there will be no appreciable tendency for any part of the stand to move out of alignment with the flexible shaft because of changes in the amount of torque incident to variations in the nature of the work accomplished thereby.

Another object is to provide such a stand which is so constructed and arranged as to be adapted for support upon an ordinary floor or platform, and in which the weight of the various parts is so distributed as to minimize all tendency of such stand to tip over as a result of any stress applied thereto incident to the use of the flexible shaft carried thereby upon any object at any side thereof and either above, parallel with or below the plane upon which such stand is supported.

Another object is to provide such a stand which is suited for mounting upon wheels or rollers, so that it may be readily transported from place to place upon a floor, pavement, deck, scaffold or other ordinarily available surface adjacent to objects upon which it is desired to perform work through the utilization of a flexible shaft; which does not require special bracing or fastening during utilization thereof; and which may be utilized while being moved from one point to another.

Still other objects will be in part obvious and in part specifically pointed out in the following specification.

This invention consists of certain features of combination, construction and arrangement of parts which can be readily understood by reference to the illustrative embodiment thereof shown in the annexed drawings and hereinafter more fully described, but this invention is not limited to the embodiment so shown and described as other embodiments may be constructed, within the scope of the appended claims, employing parts differing in number, construction and arrangement from the accompanying illustrative disclosure, without departing from the spirit of this invention.

Like reference characters denote similar parts throughout the accompanying drawings, in which—

Figs. 4, 5 and 6 are details partly in section, to be referred to.

Figure 1:
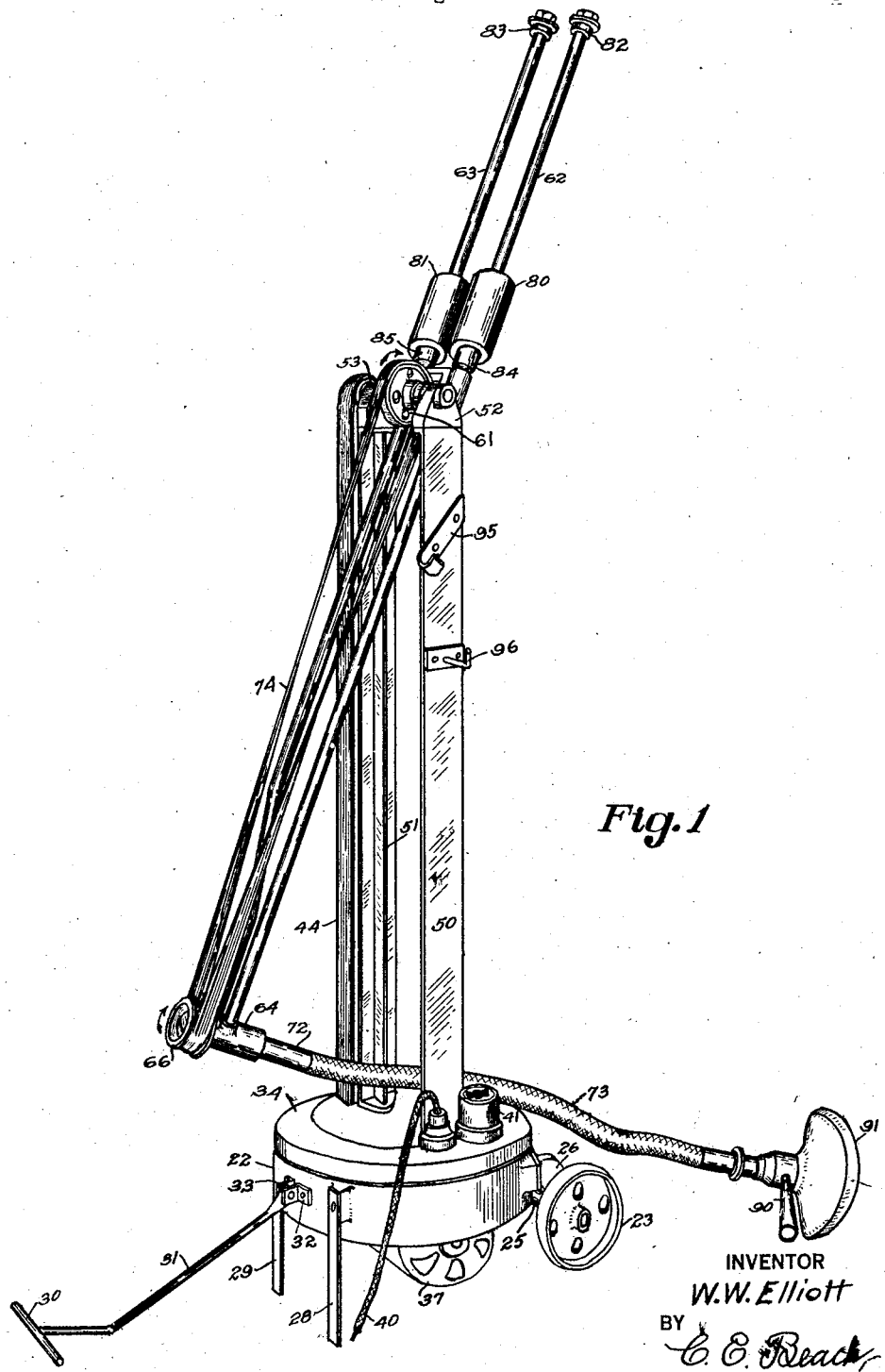
Figure 1 is a perspective view of a driving stand and flexible shaft embodying this invention, showing an emery wheel guard and hand-grip secured to the free end of the flexible shaft, and showing the various parts positioned for grinding operations near the base of the stand.

As shown in Figs. 1 to 4, inclusive, the base 22 is ring-like in form, having a vertical opening therethrough of sufficient size to receive a suitable driving motor. The brackets 26 and 27 are suitably secured to one side of the base 22, and the feet 28 and 29 are secured to the other side of said base. The wheels 23 and 24 are journaled upon the axle 25, and said axle is, in turn, journaled in the brackets 26 and 27.

The handle 30 is secured to one end of the bar 31 and the other end of said bar is journaled in the bracket 32. The bracket 32 is secured to the outer surface of the base 22 at a point intermediate the feet 28 and 29. The ear 33 is carried by the bar 31 in such relation to the base 22 that, when the handle 30 is raised, the ear 33 will engage the side of the base 22 above the bracket 32 before the handle 30 reaches an elevation at which it may be conveniently held while moving the stand from place to place, so that further upward movement of said handle will lift the feet 28 and 29 clear from the floor or other surface upon which the stand is supported.

Figure 4:
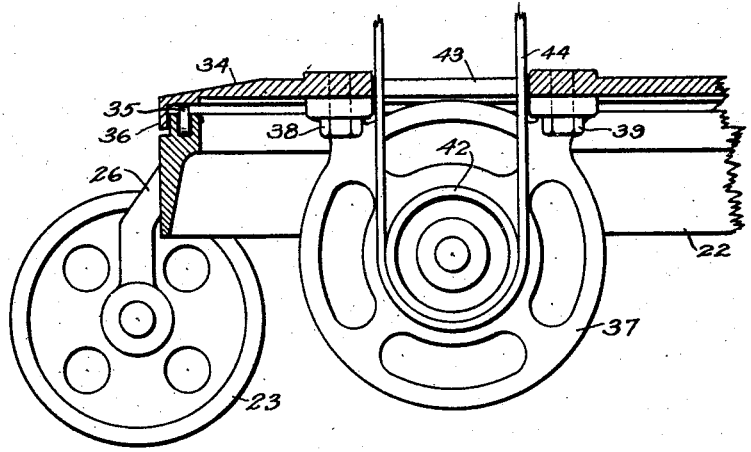

The table 34 is supported upon rollers, such as the roller 35 shown in Fig. 4, such rollers being interposed between the lower face of said table and the upper face of the base 22 for the purpose of facilitating relative movement therebetween. The edge of the table 34 carries a downwardly extending flange 36 for engaging the base 22 for the purpose of retaining said table in substantially concentric relation with said base.

The motor 37 is secured to the under side of the table 34, as by means of the bolts 38 and 39 shown in Fig. 4, said motor depending from the under side of said table through the opening provided in the base 22.

From the foregoing it will be seen that the table 34 is mounted for rotation in a horizontal plane and therefore may be properly called a turntable; and that the base 22, wheels 23 and 24, axle 25 and brackets 26 and 27 form parts of a carriage upon which said table is mounted.

A flexible cable 40 is provided for conducting operating current to the motor 37, and a switch 41 is provided for starting and stopping said motor.

The motor pulley 42 (see Fig. 4) is situated in suitable relation to an opening 43 through the base 22, so that the belt 44 may pass through said opening to and from said pulley 42 for a purpose hereinafter more fully explained.

The lower ends of the uprights 50 and 51 are firmly secured to the upper surface of the table 34, and the upper ends of said uprights carry the blocks 52 and 53. The blocks 52 and 53 are similar in construction and therefore a description of either of said blocks will suffice for both.

Figure 6:
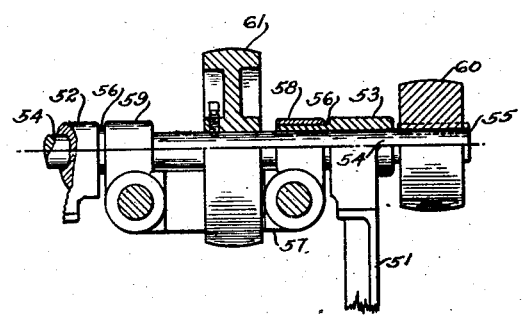

Referring to Fig. 6, it will be seen that each of these blocks has an opening 54 therethrough in which the shaft 55 is journaled, and that bosses 56 are formed on the inner faces of said blocks upon which the cradle 57 is journaled by means of the straps 58 and 59, for a purpose which will be hereinafter more fully explained.

The pulley 60 is fixed upon the shaft 55 outside of the upright 51, and the pulley 61 is fixed to said shaft between the uprights 50 and 51.

The rods 62 and 63 are fixed in the cradle 57, and adjoining ends of said rods are secured to the bearing block 64.

Figure 5:
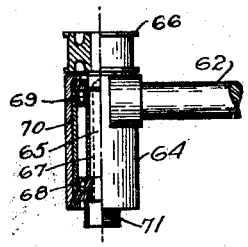

The revoluble part 65 (see also Fig. 5) is journaled in the block 64, and has the pulley 66 fixed to one end thereof; the other end of said part 65 has a recess 67 therein (as indicated by a dotted line in Fig. 5) for receiving the driving tongue of a flexible shaft; said part therefore forms a driving member for a flexible shaft.

The revoluble part 65 rides in the block 64 between the ball bearing races 68 and 69; the sleeve 70 being interposed between said ball races and said block. The sleeve 70 is journaled in the block 64 so as to permit rotation therein, and said sleeve carries the nipple 71, which nipple is externally threaded for connection thereto of the ferrule 72 which is fixed upon one end of the flexible shaft casing 73.

Figure 3:
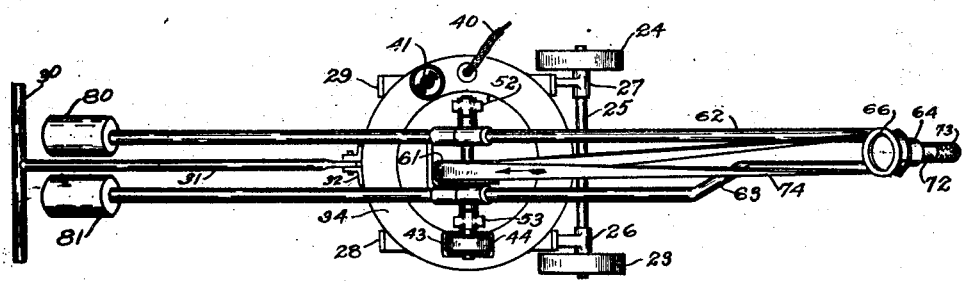
Fig. 3 is a plan view of certain of the parts as shown by Fig. 2.

The weights 80 and 81 are slidably mounted upon the rods 62 and 63, respectively, so as to counterbalance the portions of said rods which carry the block 64, said block, and the parts carried by and depending therefrom. When the parts are in a position such as that indicated by Fig. 1, it is evident that the weight to be so counterbalanced is far less than when the parts are positioned as indicated by Figs. 2 and 3; hence the weights 80 and 81 are arranged to slide along the rods 62 and 63, respectively, so as to act with maximum effectiveness when the parts are positioned as indicated by Fig. 2 and so as to act with minimum effectiveness when the parts are positioned as indicated by Fig. 1.

Cushioning stops 82 and 83 are provided upon the ends of the rods 62 and 63, respectively, for limiting the movement of the weights 80 and 81 away from the cradle 57, and cushioning stops 84 and 85 are provided for correspondingly limiting the movement of said weights toward said cradle.

The belt 74 connects the pulley 61 with the pulley 66, so that the power delivered to the belt 44 by the rotation of the motor pulley 42 will be transmitted through the pulley 61, the shaft 55, the pulley 60, said belt 74, and the pulley 66, to the revoluble part 65.

Figure 2:
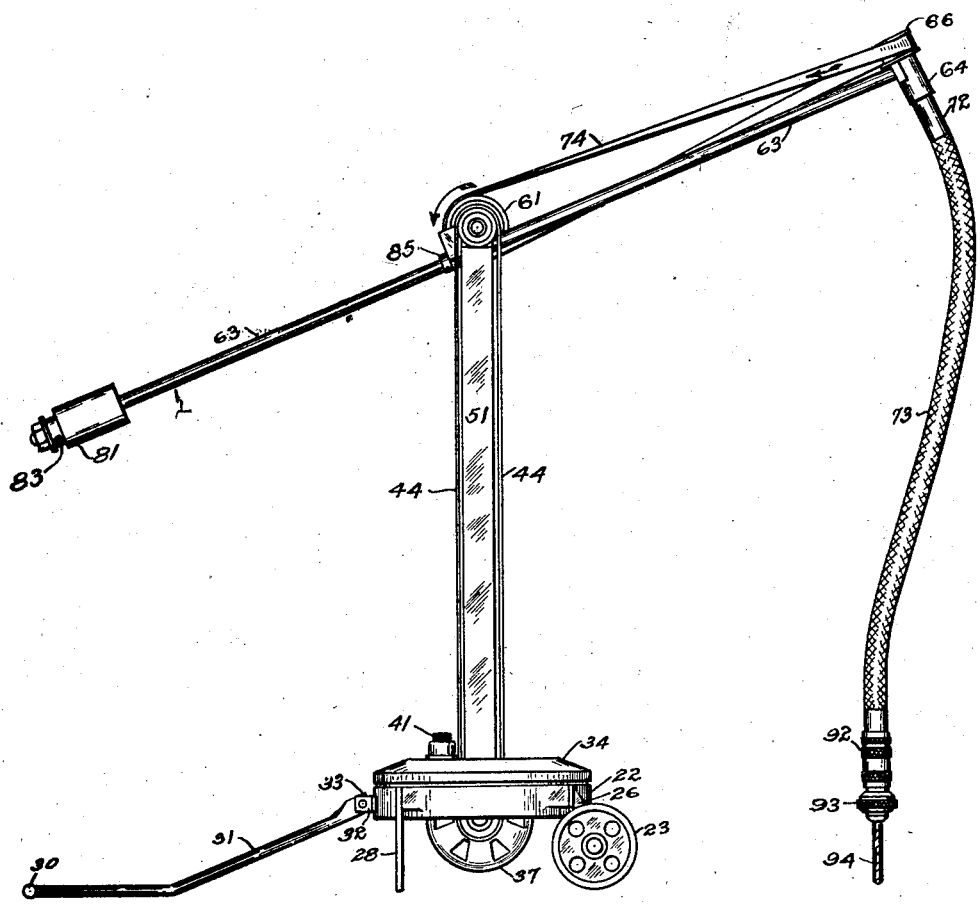
Fig. 2 is a side elevation of the stand of Fig. 1, the free end of the flexible shaft being equipped with a twist drill, and the various parts being positioned for drilling vertical holes near the base of the stand.

Referring now more particularly to Fig. 1, it will be seen that a grinding fixture is applied to the free end of the flexible shaft casing 73, which fixture comprises the hand grip or handle 90 and the emery wheel shield or guard 91. In Fig. 2, a hand grip 92 is shown at the free end of the casing 73, and a chuck 93 to be driven by the flexible shaft contained in the casing 73 and carrying a twist drill 94 are shown below the grip 92.

In assembling driving stands in accordance with this invention, the ratio between the motor pulley 42 and the flexible shaft driving pulley 66 may be readily arranged, for individual stands, so as to provide maximum working efficiency for the purpose for which the flexible shaft is to be employed, by suitable selection of pulley sizes for the pulleys 42, 61, 60 and 66.

A holder 95 is secured to the upright 50, (see Fig. 1) said holder being so fitted to the hand grip 92 and the ferrule adjoining the handle 91 that the free end of the flexible shaft may be securely retained in said holder, to the end that the emery wheel, drill or other tool operated by the flexible shaft may be used in a stationary position.

The hook 96 is provided for carrying a coil of the cable 40, when the stand is being moved from place to place.

In the operation of the driving stand shown by the accompanying drawings, such stand is moved to a position adjoining the place where work is to be accomplished, the cable 40 is connected to a source of current for operating the motor 37, the switch 41 is operated to place the motor in electrical connection with the conductors of the cable 40, and the hand grip 90 or 92 (as the case may be) is grasped, and the fixture carried at the free end of the flexible shaft is thereby manipulated so as to suitably apply such tool as is associated with such fixture to the object upon which work is to be accomplished. As such fixture is moved toward and away from the base 22, the block 64 will swing at the end of the arm forming part of the lever comprising the rods 62 and 63 to which said block is attached; and as said fixture is moved transversely to the axis of the base 22, the table 34 will turn around on said base so that the flexible shaft will at all times be disposed in a substantially straight line.

In so far as the pull applied to the belt 74 by the pulley 61 tends to swing the block 64 around the bosses 56, such pull will tend to move said block in a direction which will place the flexible shaft and the casing 73 under a slight tension, thereby cooperating with the other features of said stand in keeping said shaft in alignment with the revoluble part 65 and in preventing the development of kinks or sharp bends in such shaft.

Although the structure shown will give best results, especially in cases where such a driving stand is to be moved around on rough or irregular surfaces; in cases when the use of such a stand is to be within a comparatively restricted area throughout which a smooth, level floor surface is provided, the base 22 and the supporting parts therefor may be omitted, and suitable castors may be secured directly to the turn-table 34 so as to facilitate either circular movement of said table such as that which is facilitated by the rollers 35 in the embodiment shown, or movement from place to place such as that which is facilitated by the wheels 33 and 34.

In any event, the table 34 should be supported at such distance above the floor or other surface upon which the driving stand is to be moved that the under side of said motor will at all times be clear of such floor or other surface.

During the manipulation of the fixture carried at the free end of the flexible shaft, as hereinbefore described, the operator may have occasion to rotate the hand grip 90 or 92 (as the case may be) relatively to the bearing 64, especially in the use of a hand grip such as the grip 90 shown by Fig. 1. Upon such rotation of said casing, such casing will act through the nipple 71 to cause the sleeve 70 to rotate in the block 64, so as to prevent subjecting the casing of the flexible shaft to objectionable torsional strain; thereby avoiding such deformation of said casing as might otherwise be induced by such rotation of the hand grip, and thereby, in turn, preventing the development of the said deformation or other injury to the flexible shaft and its casing such as is likely to occur in the absence of provision for rotation of such a casing relatively to its comparatively fixed support.

In constructing driving stands in accordance with this invention, if the flexible shaft is to be employed under such conditions that there will be no occasion for the rods 62 and 63 to swing through a very extended arc, a fixed counterweight may be substituted for the slidable counterweights 80 and 81; and, under some conditions of service, the other features of this invention may be utilized without the employment of any counterweight.

It is believed that the foregoing description, taken with the accompanying drawings, will clearly disclose the construction and operation of my improved driving stand; what I therefore claim and desire to secure by Letters Patent of the United States of America is:

1. A driving stand for a flexible shaft comprising a ring-like base, a table mounted upon said base for rotation in a horizontal plane in relation thereto, a motor secured to the under side of said table within said base, flexible shaft driving and carrying means, and a support for said means secured to the upper face of said table and permitting movement of said means in a vertical plane.

2. A driving stand for a flexible shaft comprising a ring-like base, a table mounted upon said base for rotation in a horizontal plane relative thereto, a motor secured to the under side of said table within said base, a standard secured to the upper surface of said table, an intermediate shaft journaled in said standard, a boss carried by said standard in substantially concentric relation with said shaft, a lever fulcrumed around said boss, a flexible shaft and a driving member therefor, said member being so journaled at one end of said lever that the axis of rotation thereof is substantially tangent to the arc described by the end of said lever during the rotation thereof around said boss, pulleys for effecting belted connection between said flexible shaft member and said motor, and a counterweight slidably mounted upon the other end of said lever.

3. A driving stand for a flexible shaft comprising a ring-like base, a table mounted upon said base for rotation in a horizontal plane relative thereto, a motor secured to the under side of said table within said base, a standard secured to the upper surface of said table, an intermediate shaft journaled in said standard, a boss carried by said standard in substantially concentric relation with said shaft, a lever fulcrumed around said boss, a flexible shaft and a driving member therefor, said member journaled at one end of said lever and being so positioned that the axis of rotation thereof is substantially tangent to the arc described by the end of said lever during rotation thereof around said boss, pulleys for effecting belted connection between said flexible shaft member and said motor, a counterweight slidably mounted upon the other end of said lever, and cushioned stops for suitably limiting the sliding movement of said weight.

4. A driving stand for a flexible shaft comprising a ring-like base, a supporting wheel secured to said base near one side thereof, a supporting foot secured to said base near the other side thereof, a handle pivotally connected to said base near said foot so as to permit limited movement of said handle in a vertical plane, a table mounted upon said base, bearings comprising rolling members, between said table and said base for facilitating rotation of said table in a horizontal plane relative to said base, a motor secured to the under side of said table within said base, a revoluble part adapted for driving a flexible shaft, means for securing an end of a flexible shaft casing in suitable relation to said revoluble part, a flexible shaft casing one end of which is secured to said means, a flexible shaft within said casing operatively connected to said revoluble part, a jointed and counterbalanced supporting structure for said revoluble part secured to the upper face of said table and arranged to permit movement of said part to describe a complete circle in a vertical plane.

5. A driving stand for a flexible shaft comprising a hollow carriage, a table mounted on said carriage for rotation thereon in a horizontal plane, a motor secured to the under side of said table and projecting downwardly through said carriage, a supporting member secured to the upper face of said table and extending upwardly therefrom, an intermediate shaft journaled near the upper end of said member and carrying two pulleys one of which is suitably positioned for belted connection thereof with said motor, a counterbalanced arm fulcrumed on said member for rotation substantially concentric with said shaft, a second shaft journaled in an end of said arm and carrying a pulley in suitable relation to the other pulley of said first named shaft for belted connection therewith, said second shaft being so constructed and arranged as to facilitate operative connection thereto of a flexible shaft, and a connection carried by said arm end and so constructed and arranged as to be adapted for the connection thereto of an end of a flexible shaft casing.

6. A driving stand for a flexible shaft comprising a ring-like base, a table mounted upon said base for rotation in a horizontal plane in relation thereto, a motor secured to said table, flexible shaft driving and carrying means, and a support for said means secured to said table and permitting movement of said means in a vertical plane.

7. A driving stand for a flexible shaft comprising a ring-like base, a table mounted upon said base for rotation in a horizontal plane relative thereto, a motor secured to said table, a standard secured to said table, an intermediate shaft journaled in said standard, a boss carried by said standard in substantially concentric relation with said shaft, a lever fulcrumed around said boss, a flexible shaft and a driving member therefor, said member being so journaled at one end of said lever that the axis of rotation thereof is substantially tangent to the arc described by the end of said lever during the rotation thereof around said boss, pulleys for effecting belted connection between said flexible shaft member and said motor, and a counterweight slidably mounted upon the other end of said lever.

8. A driving stand for a flexible shaft comprising a ring-like base, a table mounted upon said base for rotation in a horizontal plane relative thereto, a motor secured to said table, a standard secured to said table, an intermediate shaft journaled in said standard, a boss carried by said standard in substantially concentric relation with said shaft, a lever fulcrumed around said boss, a flexible shaft and a driving member therefor, said member being journaled at one end of said lever and being so positioned that the axis of rotation thereof is substantially tangent to the arc described by the end of said lever during the rotation thereof around said boss, pulleys for effecting belted connection between said flexible shaft member and said motor, a counterweight slidably mounted upon the other end of said lever, and cushioned stops for suitably limiting the sliding movement of said weight.

9. A driving stand for a flexible shaft comprising a ring-like base, a table mounted upon said base, bearings comprising rolling members between said table and said base for facilitating rotation of said table in a horizontal plane relative to said base, a motor secured to said table, a revoluble part adapted for driving a flexible shaft, means for securing an end of a flexible shaft casing in suitable relation to said revoluble part, a flexible shaft casing one end of which is secured to said means, a flexible shaft within said casing operatively connected to said revoluble part, a jointed and counter-balanced supporting structure for said revoluble part secured to said table and arranged to permit movement of said part to describe a complete circle in a vertical plane.

10. A driving stand for a flexible shaft comprising a table mounted for rotation in a horizontal plane, a motor secured to said table, a standard secured to said table, an intermediate shaft journaled in said standard, a boss carried by said standard in substantially concentric relation with said shaft, a lever fulcrumed around said boss, a flexible shaft and a driving member therefor, said member being so journaled at one end of said lever that the axis of rotation thereof is substantially tangent to the arc described by the end of said lever during the rotation thereof around said boss, pulleys for effecting belted connection between said flexible shaft member and said motor, and a counterweight slidably mounted upon the other end of said lever.

11. A driving stand for a flexible shaft comprising a table, roller bearings, or the like, so supporting said table as to facilitate rotation thereof in a horizontal plane, a motor secured to said table, a revoluble part adapted for driving a flexible shaft, means for securing an end of a flexible shaft casing in suitable relation to said revoluble part, a flexible shaft casing one end of which is secured to said means, a flexible shaft within said casing operatively connected to said revoluble part, a jointed and counter-balanced supporting structure for said revoluble part secured to said table and arranged to permit movement of said part to describe a complete circle in a vertical plane.

In witness whereof, I hereunto subscribe my name, this 22nd day of July 1921.

WINFRED W. ELLIOTT.